United States Patent [19]

Glynn et al.

[11] Patent Number: 5,143,383
[45] Date of Patent: Sep. 1, 1992

[54] STEPPED TOOTH ROTATING LABYRINTH SEAL

[75] Inventors: Christopher C. Glynn, Hamilton; Byron E. Swanson, West Chester; Melvin Bobo, Cincinnati, all of Ohio

[73] Assignee: General Electric Company, Cincinnati, Ohio

[21] Appl. No.: 483,594

[22] Filed: Feb. 21, 1990

Related U.S. Application Data

[63] Continuation of Ser. No. 376,178, Jun. 30, 1989, abandoned, which is a continuation of Ser. No. 38,452, Apr. 13, 1987, abandoned, which is a continuation of Ser. No. 903,825, Sep. 3, 1986, abandoned, which is a continuation of Ser. No. 752,482, Jul. 5, 1985, abandoned, which is a continuation-in-part of Ser. No. 616,262, Jun. 4, 1984, abandoned.

[51] Int. Cl.$^5$ .................. F16J 15/447; F01D 11/02
[52] U.S. Cl. ..................... 277/53; 415/174.4; 415/174.5
[58] Field of Search ............. 415/173.5, 173.4, 174.4, 415/174.5; 277/53-57

[56] References Cited

U.S. PATENT DOCUMENTS

| | | | |
|---|---|---|---|
| 899,319 | 9/1908 | Parson et al. | 415/172 A |
| 3,042,365 | 7/1962 | Curtis et al. | 277/53 |
| 3,092,393 | 6/1963 | Morley et al. | 415/174 |
| 3,514,112 | 5/1970 | Pettengill | 277/53 |
| 3,733,146 | 5/1973 | Smith et al. | 415/172 A |
| 4,351,532 | 9/1982 | Laverty | 277/53 |
| 4,386,784 | 6/1983 | Banks | 415/172 R |

FOREIGN PATENT DOCUMENTS

| | | | |
|---|---|---|---|
| 193192 | 12/1907 | Fed. Rep. of Germany | 415/174 |
| 376020 | 10/1939 | Italy | 277/53 |
| 225936 | 12/1924 | United Kingdom | 277/53 |
| 733918 | 7/1955 | United Kingdom | 415/172 A |

OTHER PUBLICATIONS

J. A. Harris et al., AFWAL-TR-80-4118—Concept Definition: Retirement for Cause of F100 Rotor Components—Sep. 1980.

Primary Examiner—Allan N. Shoap
Attorney, Agent, or Firm—Carmen Santa Maria; Stephen S. Strunck; Jerome C. Squillaro

[57] ABSTRACT

A rotating labyrinth seal especially useful for effecting sealing between two plenums in aircraft gas turbine engines comprising a base and a plurality of radially-directed seal teeth rings extending circumferentially around the outer peripheral surface of the base. Each of the seal teeth rings has a body portion and a tip portion, with the body portion being substantially thicker than the tip portion. Seal teeth rings of the invention exhibit improved resistance to fatigue crack propagation compared to conventional seal teeth rings.

3 Claims, 2 Drawing Sheets

STEPPED TOOTH ROTATING LABYRINTH SEAL

This application is a continuation of Ser. No. 07/376,178 filed Jun. 30, 1989, now abandoned, which is a continuation of Ser. No. 07/038,452 filed Apr. 13, 1987, now abandoned, which is a continuation of Ser. No. 06/903,825 filed Sep. 3, 1986, now abandoned, which is a continuation of Ser. No. 06/752,482 filed Jul. 5, 1985, now abandoned, which is a continuation-in-part of Ser. No. 06/616,262 filed Jun. 4, 1984, now abandoned.

BACKGROUND OF THE INVENTION

The present invention relates generally to rotating labyrinth seals and particularly to rotating labyrinth seals used in gas turbine engines for the propulsion of aircraft.

Rotating labrinth seals have a wide variety of uses and one such use is to effect sealing between plenums at different pressures in gas turbine engines. Such seals generally consist of two principal elements, i.e., a rotating seal and a static seal. The rotating seal, in cross section parallel to the axial length of the engine, frequently has rows of thin tooth-like projections extending radially from a relatively thicker base toward the static seal. The static seal or stator is normally comprised of a thin honeycomb ribbon configuration. These principal elements are generally situated circumferentially about the axial (lengthwise) dimension of the engine and are positioned with a small radial gap therebetween to permit assembly of the rotating and static components.

When the gas turbine engine is operated, the rotating seal expands radially more than the stator and rubs into the stator seal. The thin honeycomb ribbon construction of the stator reduces the surface area on which the seal teeth rub and thus helps to minimize the heat transferred into the rotating seal. In addition, the rotating seal teeth tips are made thin in order to thermally isolate them from the supporting base or shell structure.

The thin tooth configuration is, however, susceptible to handling damage which can result in cracks in the tips of the teeth opposite the base. In some cases, rub-generated cracks during operation may also be formed on the tooth tips. These seal tooth cracks propagate through the teeth radially inward into the supporting shell structure and, left undetected, can eventually spread toward the ends of the support structure resulting in failure of the seal.

The cross-sectional configuration of the seal teeth in the prior art is generally one of a truncated triangular configuration with straight sloping sides meeting at a thin, flat tip. Such prior art configurations of the seal teeth have provided insufficient stalling or arresting of such cracks once they have begun.

SUMMARY OF THE INVENTION

It is therefore a general object of this invention to provide an improved configuration for the seal teeth of rotating labyrinth seals which provides a greatly increased resistance to crack propagation.

Another important object of this invention is to provide this novel seal tooth configuration which resists crack propagation while still maintaining a thin, lightweight tooth necessary and desirable in gas turbine engines for aircraft propulsion.

These and other objects of the invention are attained by providing a crack stalling rotating labyrinth seal comprising a plurality of radially-directed seal teeth rings extending circumferentially around the outer periphery of a base, each of the seal teeth rings having a body portion and a tip portion, the body portion being substantially thicker than the tip portion.

More specifically, the body portion has body walls which extend radially from the base portion and circumferentially about the base and axial centerline of the engine with the distance between the body walls being the thickness of the body. The body further has body circumferential walls which form the outer circumference of the body portion and lie on either side of the tip portion. The tip portion similarly has tip walls extending radially from the circumferential walls of the body and circumferentially about the axial centerline of the engine with the distance between the tip walls being the thickness of the tip. The tip walls terminate at a circumferential tip surface which forms the outer circumference of the tip portion. The junction between the tip walls and the body circumferential surfaces is a fillet having a predetermined fillet radius.

In order to realize the crack stalling benefits of the invention, the ratio of the thickness of the body to the sum of the thickness of the tip plus twice the fillet radius should be greater than about one. Teeth of the invention have shown up to about a 3:1 improvement in tooth and seal life over that of teeth of prior art configurations.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENTS

Figure 1:
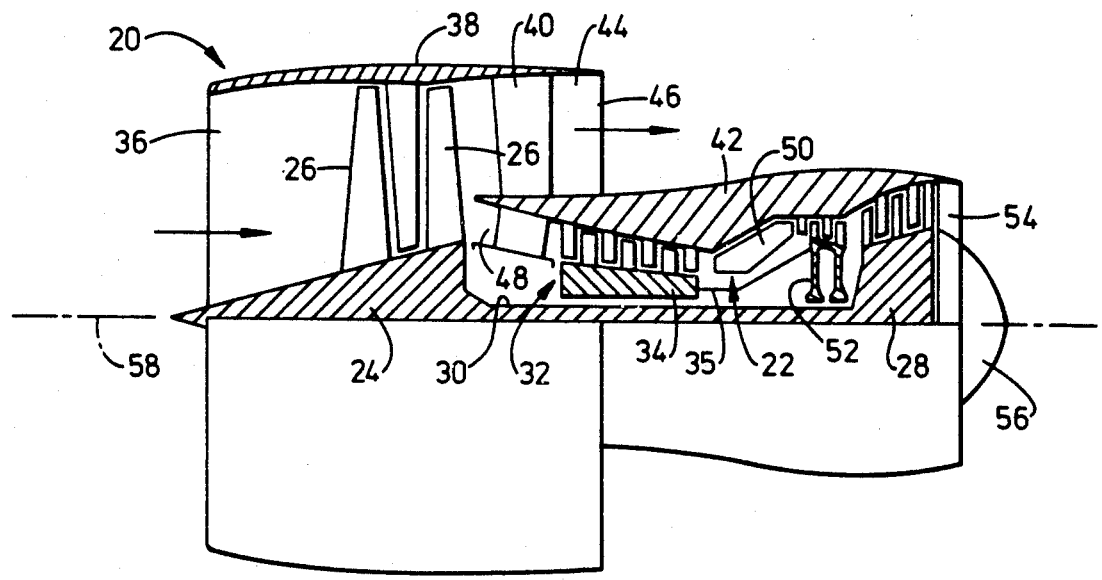
FIG. 1 is a simplified cross-sectional view, in partial cutaway, of an aircraft gas turbofan engine.

Referring to FIG. 1 of the drawings, there is diagrammatically illustrated a gas turbofan engine, generally designated by the numeral 20. While it is recognized that turbofan engines are well known in the art, a brief description of the operation of engine 20 will enhance appreciation of the interrelationship of the various components by way of background for the invention to be described below. Basically, engine 20 may be considered as comprising core engine 22, fan 24 including a rotatable stage of fan blades 26, and fan turbine 28 downstream of core engine 22 and which is interconnected to fan 24 by shaft 30. Core engine 22 includes axial flow compressor 32 having rotor 34. Air enters inlet 36 from the left of FIG. 1, in the direction of the solid arrow, and is initially compressed by fan blades 26.

A fan cowl or nacelle 38 circumscribes the forward part of engine 20 and is interconnected therewith by a plurality of radially outwardly extending outlet guide vane assemblies 40, (one shown) substantially equiangularly spaced apart around core engine cowl 42. A first portion of the relatively cool, low pressure compressed air exiting fan blades 26 enters fan bypass duct 44 defined between core engine cowl 42 and fan cowl 38, and discharges through fan nozzle 46. A second portion of the compressed air enters core engine inlet 48, is further compressed by axial flow compressor 32, and is discharged to combustor 50 where it is mixed with fuel and burned to provide high energy combustion gases which drive core (or high pressure) engine turbine 52. Turbine 52, in turn, drives rotor 34 by means of shaft 35 in the usual manner of gas turbine engines. The hot gases of combustion then pass through and drive fan (or low pressure) turbine 28 which, in turn, drives fan 24. A propulsive force is thus obtained by the action of fan 24 discharging air from fan bypass duct 44 through fan nozzle 46 and by the discharge of combustion gases from core engine nozzle 54 defined, in part, by plug 56 and cowl 42 of core engine 22. It will be appreciated that the pressure of the various gases within the engine 20 will vary as a function of position along engine axial centerline 58. To isolate the various sections and the pressures therein from each other, rotating labyrinth seals are commonly used.

Figure 2:
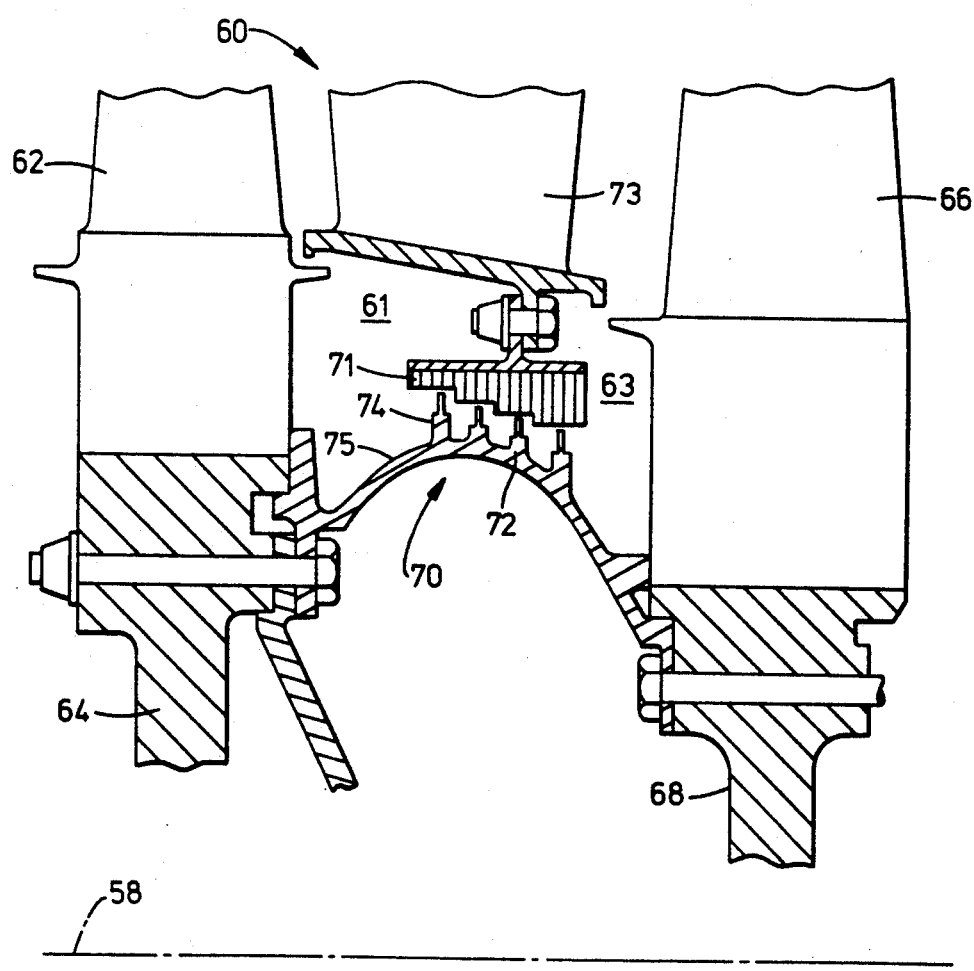
FIG. 2 is a partial cross-sectional view of a typical two-stage high pressure turbine of a gas turbine engine.

Referring to FIG. 2 of the drawings, there is shown a partial view of a high pressure turbine section generally designated 60 which is a section of aircraft gas turbine engines which typically utilize rotating labyrinth seals. The high pressure turbine 60 includes a plurality of radially extending stage-one blades suitably mounted in stage-one turbine disks, one set of which is shown and labeled 62 and 64, respectively. High pressure turbine 60 also includes a plurality of radially extending, stage-two blades suitably mounted in stage-two turbine disks, one set of which is shown and labeled 66 and 68, respectively. Stage-one blade 62 and disk 64 lie upstream in relation to downstream stage-two blade 66 and disk 68. The flow of hot gases in high pressure turbine 60 is from upstream to downstream, i.e., from left to right in FIG. 2.

The high pressure turbine 60 further includes a rotating labyrinth seal 70 and a stator or static seal 71. Rotating labyrinth seal 70 is suitably mounted between the stage-one turbine disk 64 and the stage-two turbine disk 68. Stationary static seal 71 is attached to stage-two nozzle 73. The stage-one nozzle (not shown) lies upstream from the stage-one blades.

Rotating labyrinth seal 70 comprises base 72 and a plurality of seal teeth 74 radially extending from the outer peripheral surface 75 of base 72. The outer circumference of the seal teeth 74 rotate within a small tolerance of the inner circumference of the stator 71, thereby effecting a sealing between stage-one plenum 61 and stage-two plenum 63. Base 72 as shown has an annular configuration and a generally arcuate cross section, but other configurations are frequently encountered in gas turbine engines. Seal teeth 74 may be attached to, as by welding, or be integrally machined in seal 70 and extend in ring-like fashion circumferentially about base 72 and axial centerline 58.

Figure 3A:
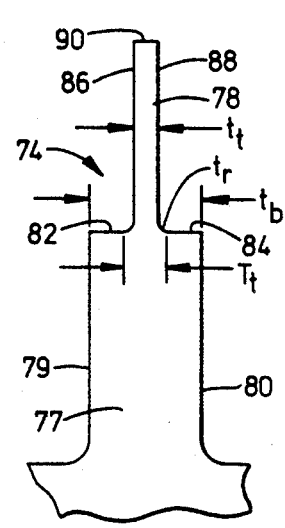
FIG. 3A is a partial cross-sectional view of a stepped tooth of the present invention for use with a rotating labyrinth seal.

Each of the seal teeth 74 according to the present invention, as better shown in FIG. 3A, has body portion 77 and tip portion 78. Each of body portions 77 has body walls 79 and 80 which extend radially from the base and circumferentially about the centerline axis of the engine. Body portion 77 also has body circumferential walls 82 and 84 which lie along the outer circumference of body portion 77 on either side of tip portion 78.

Figure 3B:
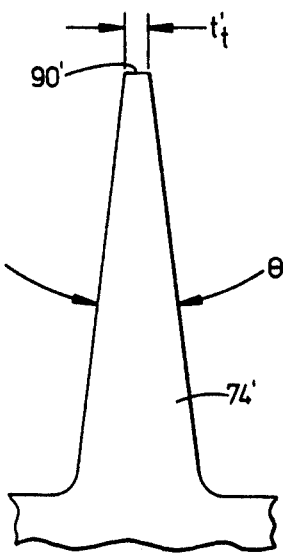
FIG. 3B is a partial cross-sectional view of a typical prior art tooth of a rotating labyrinth seal.

Each of tip portions 78 include radially extending tip walls 86 and 88 extending radially from circumferential walls 82 and 84, respectively. Tip portion 78 further has circumferential tip surface 90 which lies along the outer circumference of the tip portion 78, in which tip walls 86, 88 terminate, which surface 90 is coaxial with body circumferential walls 82, 84. In contrast to the seal teeth of the present invention shown in FIG. 3A, there is shown in FIG. 3B a prior art seal tooth 74' which is generally of truncated triangular shape.

In accordance with the present invention, in order to obtain effective stalling or arresting of propagating cracks the ratio of the distances between body walls 79, 80 (body thickness or $t_b$) and tip walls 86, 88 (tip thickness or $t_t$) plus twice the tip fillet radius ($t_r$) should be greater than about one, i.e., $[t_b/T_t] \gtrsim 1$, where $T_t = t_t + 2t_r$, and the ratio of the distances between body walls 79, 80 and tip walls 86, 88 plus twice the tip fillet radius should be less than about 3.2, i.e., $[t_b/T_t] \lesssim 3.2$.

Preferably, and as shown in FIG. 3A, tip walls 86, 88 are parallel to each other and to body walls 79, 80. Tip walls 86, 88 and body walls 79, 80 may be of a truncated triangular shape, as shown in FIG. 3B, in which case $t_t$ would be measured in tip portion 78 at the termination of the fillet radius $t_r$ and $t_b$ would be the thickness of body 77 as measured at circumferential walls 82, 84.

Figure 4:
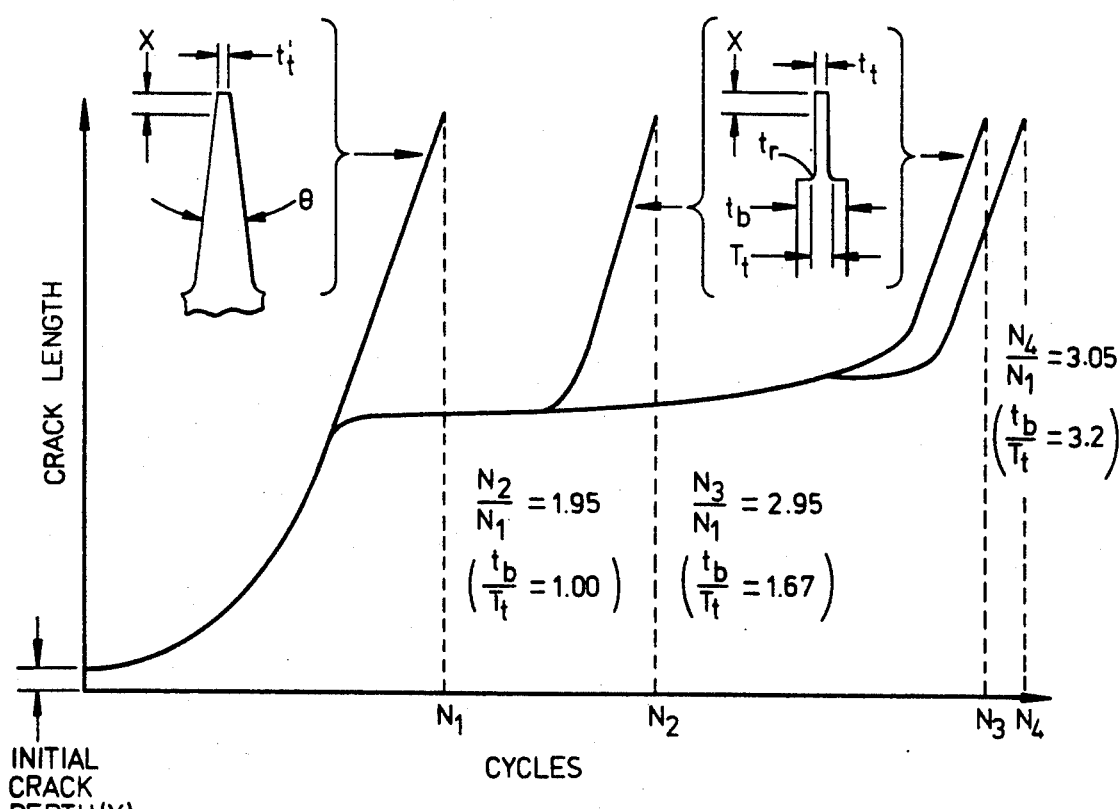
FIG. 4 is a graph of crack length versus tension-tension fatigue cycles for rotating labyrinth seal tooth configurations of the prior art and of the present invention.

The effectiveness of seal teeth according to the present invention is shown in FIG. 4. Therein, crack length is plotted as a function of tension-tension fatigue cycles. The tension-tension tests replicate the fatigue-causing hoop stresses to which such seals are commonly exposed during engine operation. A segment of a conventional seal tooth having $\theta = 15°$ $t_{t'} = 0.015$ inches was tested against segments of seal teeth of the present invention having ratios of $t_b/T_t$ of 1, 1.67 and 3.2. The material of the teeth was a nickel-base alloy from which such seals are typically manufactured and the initial crack length (X) was 0.015 inches. As can be seen from FIG. 4, the seal tooth of the present invention exhibited up to a 3 to 1 improvement in cycles to failure over that of the conventional seal tooth.

The invention consists of certain novel features and a combination of parts hereinbefore fully described, illustrated in the accompanying drawings, and particularly pointed out in the appended claims, it being understood that various changes in the details may be made without departing from the spirit, or sacrificing any of the advantages of the present invention.

We claim:
1. A rotating labyrinth seal comprising:
a) a base having an outer peripheral surface, and
b) a plurality of radially directed seal teeth rings, each ring extending circumferentially around said outer peripheral surface of said base, each of said seal teeth rings having:
c) a body portion having a pair of radially extending substantially parallel body walls, the distance between said body walls being the thickness ($t_b$) of said body portion, and
d) a tip portion having a pair of radially extending tip walls substantially parallel to each other and to said body walls, the distance between said tip walls being the thickness ($t_t$) of said tip, each of said body portions further having a pair of body circumferential surfaces situated on opposite sides of the associated tip portion, each of said tip portions further having a top circumferential surface coaxial to said pair of body circumferential surfaces of the associated body portion, the junction between said tip walls and said body circumferential surfaces being a fillet having a fillet radius ($t_r$) and wherein the ratio of said body thickness ($t_b$) to the sum of said tip thickness ($t_t$) plus twice the fillet radius ($t_r$) is greater than about 1.0 and less than about 3.2.

2. The seal of claim 1 wherein said base is annular and of an arcuate cross section.

3. The seal of claim 1 wherein said seal effects sealing between two plenums in a gas turbine engine.

* * * * *